US012305423B2

(12) United States Patent
Curry

(10) Patent No.: US 12,305,423 B2
(45) Date of Patent: May 20, 2025

(54) LOCKING DEVICE

(71) Applicant: Snap-on Incorporated, Kenosha, WI (US)

(72) Inventor: David D. Curry, Kenosha, WI (US)

(73) Assignee: Snap-on Incorporated, Kenosha, WI (US)

(*) Notice: Subject to any disclaimer, the term of this patent is extended or adjusted under 35 U.S.C. 154(b) by 247 days.

(21) Appl. No.: 17/938,921

(22) Filed: Sep. 6, 2022

(65) Prior Publication Data

US 2024/0076904 A1 Mar. 7, 2024

(51) Int. Cl.
*E05B 47/00* (2006.01)
*B25H 3/00* (2006.01)

(52) U.S. Cl.
CPC ........... *E05B 47/0001* (2013.01); *B25H 3/00* (2013.01); *E05B 2047/002* (2013.01);
(Continued)

(58) Field of Classification Search
CPC ............. E05B 47/0001; E05B 47/0012; E05B 2047/002; E05B 2047/0024;
(Continued)

(56) References Cited

U.S. PATENT DOCUMENTS 4,645,050 A * 2/1987 Ingenhoven ............ E05B 81/25 192/36
5,249,657 A * 10/1993 Miyoshi .................. F16D 43/16 188/82.84
(Continued)

FOREIGN PATENT DOCUMENTS

| | | | | |
|---|---|---|---|---|
| AU | 2015218412 A1 * | 9/2015 | B25H 3/028 |
| CA | 2567191 A1 * | 5/2007 | E05B 47/0012 |
| CN | 105386645 | 3/2016 | |
| CN | 105756432 A * | 7/2016 | E05B 15/108 |

(Continued)

OTHER PUBLICATIONS

Search Report prepared by the Great Britain Intellectual Property Office in application No. GB2312777.2 dated Mar. 1, 2024.

*Primary Examiner* — Nicholas L Foster
*Assistant Examiner* — Steven A Tullia
(74) *Attorney, Agent, or Firm* — McDonnell Boehnen Hulbert & Berghoff LLP

(57) ABSTRACT

A locking device includes a locking arm movable between a locked position and an unlocked position. The locking device additionally includes a shaft that engages the locking arm so as to move the locking arm between the locked and the unlocked position. The locking device further includes a key-driven actuator configured to rotate the shaft. The locking device also includes a motor-driven assembly which engages and rotates the shaft. The motor-driven assembly includes a motor, a rotatable screw, and a gear. The motor-driven assembly also includes a clutch which engages the shaft upon rotation of the gear. The clutch includes a first pawl configured to be actuated when the gear rotates in a first direction and a second pawl configured to be actuated when the gear rotates in a second direction, where the first and second pawls are configured to disengage with the shaft when the rotatable screw is stationary.

20 Claims, 6 Drawing Sheets

(52) U.S. Cl.
CPC ................. *E05B 2047/0024* (2013.01); *E05B 2047/0026* (2013.01); *E05B 2047/0084* (2013.01); *E05B 2047/0094* (2013.01)

(58) Field of Classification Search
CPC ..... E05B 2047/0026; E05B 2047/0084; E05B 2047/0094; E05B 65/52; E05B 65/5215; E05B 65/5246; E05B 17/044; E05B 17/0054; B25H 3/00
USPC .............................................. 70/278.3, 278.2
See application file for complete search history.

(56) References Cited

U.S. PATENT DOCUMENTS 6,116,067 A * 9/2000 Myers ................... E05B 65/462 70/279.1
6,374,649 B1 * 4/2002 Holcomb ........... G07C 9/00182 312/215
6,418,765 B1 * 7/2002 Chiu ................... E05B 47/0012 70/279.1
6,460,903 B1 * 10/2002 Ming-Chih ........... E05B 47/068 292/172
6,517,127 B1 * 2/2003 Lu ....................... E05B 47/0012 292/144
6,585,302 B2 * 7/2003 Lin ..................... E05B 47/0012 292/144
6,845,642 B2 1/2005 Imedio
7,516,633 B1 4/2009 Chang
7,543,469 B1 6/2009 Tseng et al.
7,826,837 B1 11/2010 Huang et al.
7,827,837 B2 * 11/2010 Huang .................. E05B 47/068 70/279.1
7,966,854 B2 6/2011 Imedio
8,141,400 B2 * 3/2012 Sorensen ............. E05B 47/068 70/277
8,365,561 B2 * 2/2013 Chang ..................... E05B 47/02 70/279.1
8,490,445 B2 7/2013 Chiou et al.
8,555,684 B1 10/2013 Chen
8,621,900 B2 1/2014 Wu et al.
8,702,133 B2 4/2014 Fanping et al.
8,720,239 B2 5/2014 Crass et al.
9,051,762 B2 * 6/2015 Huang .................... E05B 49/00
9,217,264 B2 12/2015 Milton-Benoit et al.
9,518,406 B1 * 12/2016 Buerger .................. E05B 17/22
9,850,687 B2 * 12/2017 Roatis ................... E05B 65/462
10,012,274 B2 * 7/2018 Jo ....................... E05B 63/0065
10,047,544 B2 8/2018 Yen et al.
10,060,157 B1 8/2018 Sharp
10,145,147 B2 12/2018 Ferreira et al.
10,385,588 B2 8/2019 Huang et al.
10,526,813 B2 1/2020 Bliding et al.
10,563,705 B2 2/2020 Lu et al.
10,669,745 B2 * 6/2020 Liddell ............... E05B 47/0012
10,697,201 B2 6/2020 Sharp
10,738,506 B2 * 8/2020 Holmes ............... E05B 47/0012
10,858,862 B2 * 12/2020 Seacat ....................... E05B 9/02
11,021,894 B1 6/2021 Zastrow et al.
11,047,152 B2 6/2021 Shen et al.
11,255,108 B2 2/2022 Leung et al.
11,686,128 B2 * 6/2023 Arnold ................ E05B 47/0012 70/78
11,905,737 B2 * 2/2024 Liang .................. E05B 47/0012
11,920,376 B2 * 3/2024 Min ...................... F16D 41/088
2002/0144526 A1 10/2002 Ming-Chih
2002/0148702 A1 * 10/2002 Minasian ................ E05B 81/25 74/89.17
2003/0209042 A1 11/2003 Yeh et al.
2003/0209043 A1 11/2003 Yeh et al.
2007/0169525 A1 * 7/2007 Chang .................. E05B 47/068 70/472
2009/0173114 A1 7/2009 Lin et al.
2009/0173120 A1 7/2009 Lin et al.
2009/0211320 A1 8/2009 Wen-Pin
2010/0212381 A1 * 8/2010 Huang .................. E05B 47/068 70/279.1
2013/0167598 A1 * 7/2013 Huang .................. E05B 13/101 74/25
2015/0211260 A1 * 7/2015 Chen ..................... E05B 47/026 74/625
2018/0266146 A1 9/2018 Huang et al.
2019/0128021 A1 5/2019 Notkin
2019/0249723 A1 * 8/2019 Lu .......................... F16D 21/06
2020/0270905 A1 8/2020 Sharp
2020/0332563 A1 10/2020 Lai
2022/0003022 A1 1/2022 Shen et al.
2022/0025675 A1 1/2022 Chan
2022/0064995 A1 * 3/2022 Chen ....................... E05B 63/18
2022/0082141 A1 * 3/2022 Petty ....................... E05B 47/02
2023/0116243 A1 * 4/2023 Lu ....................... E05B 47/0012 70/277
2024/0076904 A1 * 3/2024 Curry ...................... E05B 65/52

FOREIGN PATENT DOCUMENTS

CN 109253214 A * 1/2019 ............. E05B 15/00
CN 111622610 A * 9/2020 ............. E05B 15/00
CN 112343431 A * 2/2021 ............. E05B 15/00
CN 112780122 A * 5/2021 ............. E05B 15/00
CN 112942997 A * 6/2021 ............. E05B 15/00
CN 114215426 A * 3/2022 ......... E05B 47/0012
CN 114412283 A * 4/2022 ............. E05B 15/00
CN 115095228 A * 9/2022 ............. E05B 15/00
CN 115538858 A * 12/2022 ............. E05B 15/00
DE 102005034618 1/2007
DE 102008063061 6/2010
EP 2169153 9/2011
EP 2592203 A2 * 5/2013 ......... E05B 47/0012
EP 2852772 B1 * 7/2017 ............. F16D 41/10
EP 3626991 3/2020
JP 2007002458 A * 1/2007 ............. E05B 47/00
JP 2007303139 A * 11/2007 ............. E05B 47/00
JP 2008057166 A * 3/2008 ............. E05B 47/00
JP 5278934 B2 5/2013
JP 2013204367 A 10/2013
TW 262979 B1 * 10/2006 ......... E05B 47/0012
WO WO-0005674 A2 * 2/2000 ............. E05B 81/25
WO WO-2005026475 A2 * 3/2005 ......... E05B 17/0029
WO WO-2015065944 A1 * 5/2015 ........... E05B 27/083
WO 2021046790 3/2021

* cited by examiner

LOCKING DEVICE

BACKGROUND

Locks are found in many enclosures, such as tool storage devices. Typical locks can be opened manually with a key driven actuator, and others can be opened remotely with an electronic lock. The electronic lock is located inside a component of the enclosure being locked and communicates with a remote through wireless or wired methods to lock the component. Some locks use lock rods to engage the enclosure and prevent the opening of the component in a locked state. To unlock the component, an apparatus retracts the lock rod from the enclosure so the component can freely move.

OVERVIEW

Several example implementations relate to a locking device with a key-driven actuator and a motor-driven assembly. Example locking devices described herein may be incorporated in a tool storage unit to lock or unlock a component of the unit, such as a door or drawer.

More particularly, example locking devices include a dual directional clutch. Namely, example implementations include a motor-driven assembly and a key driven actuator. The motor-driven assembly is configured to selectively decouple from a lock rod of the locking device when the key-driven actuator is actuated. In this way, when a user utilizes the key-driven actuator, the user does not need to displace components of the motor-driven assembly which would require a greater application of force when locking and unlocking the locking device. Further, if the motor-driven assembly is not operational (e.g., mechanical failure or loss of power), the user can still use the key-driven actuator without engaging or displacing components of the motor-driven actuator.

In a first implementation, a locking device is provided. The locking device includes a locking arm movable between a locked position and an unlocked position. The locking device also includes a shaft including a first set of gear teeth and a set of ratchet teeth that engage the locking arm so as to move the locking arm between the locked position and the unlocked position. The locking device further includes a key-driven actuator configured to rotate the shaft with movement of a key. The locking device additionally includes a motor-driven assembly configured to selectively engage the shaft and rotate the shaft. The motor-driven assembly includes a motor and a rotatable screw coupled to the motor. The motor-driven assembly also includes a gear including a second set of gear teeth on an outer perimeter of the gear, a first cam surface on an inner perimeter of the gear and a second cam surface on the inner perimeter of the gear, wherein the second set of gear teeth engage the rotatable screw. The motor-driven assembly further includes a clutch configured to selectively engage the shaft upon rotation of the gear. The clutch includes a first pawl configured to be actuated by the first cam surface, when the gear rotates in a first direction, so as to engage the first set of gear teeth of the shaft. The clutch additionally includes a second pawl configured to be actuated by the second cam surface, when the gear rotates in a second direction, so as to engage the first set of gear teeth of the shaft. The first and second pawls are configured to disengage with the shaft when the rotatable screw is stationary.

In an embodiment of the locking device, the first pawl is coupled to a first pawl spring and the second pawl is coupled to a second pawl spring. The first and second pawls are configured to disengage with the shaft when the rotatable screw is stationary by way of the first and second pawl springs.

In an embodiment of the locking device, when the first pawl is actuated by the first cam surface, the first pawl spring is compressed.

In an embodiment of the locking device, when the second pawl is actuated by the second cam surface, the second pawl spring is compressed.

In an embodiment of the locking device, the first pawl and the second pawl are bias in a disengaged position.

In an embodiment of the locking device, the locking arm comprises rack gear engageable with the set of ratchet teeth.

In an embodiment of the locking device, the locking device includes a lock rod coupled to the locking arm by way of a lock rod finger, wherein the lock rod is movable between a locked position and an unlocked position.

In an embodiment of the locking device, the lock rod finger is a first lock rod finger, and wherein the key-driven actuator comprises a second lock rod finger coupled to the lock rod.

In an embodiment of the locking device, the motor comprises a transceiver that is configured to communicate with a remote control apparatus to remotely operate the motor.

In an embodiment of the locking device, the transceiver is configured to communicate with the remote control by way of at least one of infrared, radio frequency identification (RFID), cellular, WIFI, Bluetooth, wireless signal, or a wired connection.

In an embodiment of the locking device, the clutch comprises a wave spring set.

In an embodiment of the locking device, the gear is a worm gear and wherein the rotatable screw is a worm gear screw.

In an embodiment of the locking device, the locking device is coupled to a tool box, wherein moving the locking arm to the locked position locks the toolbox, and wherein moving the locking arm to the unlocked position unlocks the tool box.

In an embodiment of the locking device, the first cam surface is a first set of cam surfaces, and wherein the second cam surface is a second set of cam surfaces.

In an embodiment of the locking device, wherein the first pawl is a first set of pawls, and wherein the second pawl is a second set of pawls.

In an embodiment of the locking device, the key-driven actuator is configured to move the locking arm between the locked position and the unlocked position with movement of a key.

In a second implementation, a tool storage unit is provided. The tool storage unit tool storage unit includes a housing configured to store a tool and a locking device coupled to the housing. The locking device includes a locking arm movable between a locked position and an unlocked position. The locking device also includes a shaft including a first set of gear teeth and a set of ratchet teeth that engage the locking arm so as to move the locking arm between the locked position and the unlocked position. The locking device further includes a key-driven actuator configured to rotate the shaft with movement of a key. The locking device additionally includes a motor-driven assembly configured to selectively engage the shaft and rotate the shaft. The motor-driven assembly includes a motor, a rotatable screw coupled to the motor, and a gear. The gear includes a second set of gear teeth on an outer perimeter of the gear, a first cam surface on an inner perimeter of the gear and a second cam surface on the inner perimeter of the gear, wherein the second set of gear teeth engage the rotatable screw. The motor-driven assembly also includes a clutch configured to selectively engage the shaft upon rotation of the gear. The clutch includes a first pawl configured to be actuated by the first cam surface, when the gear rotates in a first direction, so as to engage the first set of gear teeth of the shaft and a second pawl configured to be actuated by the second cam surface, when the gear rotates in a second direction, so as to engage the first set of gear teeth of the shaft. The first and second pawls are configured to disengage with the shaft when the rotatable screw is stationary and moving the locking arm between the locked position and the unlocked position unlocks the housing.

In an embodiment of the tool storage unit, the first pawl is coupled to a first pawl spring and the second pawl is coupled to a second pawl spring, and wherein the first and second pawls are configured to disengage with the shaft when the rotatable screw is stationary by way of the first and second pawl springs.

In an embodiment of the tool storage unit, when the first pawl is actuated by the first cam surface, the first pawl spring is compressed.

In an embodiment of the tool storage unit, when the second pawl is actuated by the second cam surface, the second pawl spring is compressed.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

The drawings are schematic and not necessarily to scale. In the drawings, similar symbols typically identify similar components, unless context dictates otherwise.

DETAILED DESCRIPTION

This description describes several example embodiments, at least some which relate to locking devices. In example embodiments, the locking device includes a dual directional clutch, such that a motor-driven assembly can selectively decouple from the locking device when the key-driven actuator is actuated.

In examples of the present disclosure, a locking device with a key-driven actuator and a motor-driven assembly are disclosed. More particularly, the locking device includes a lock rod and locking arm both movable from a locked position and an unlocked position by way of either the key-driven actuator or the motor-driven assembly. Components of the motor-driven assembly selectively engage and disengage with the locking arm. Accordingly, the motor-driven assembly can engage with the locking arm when the motor-driven assembly is actuated. And the motor-driven assembly can disengage with the locking arm when the key-driven actuator is actuated (and the motor-driven assembly is not actuated). Accordingly, when a user uses a standard key to lock or unlock the locking device by way of the key-driven actuator, the user does not engage and displace components of the motor-driven assembly. This is desirable, as displacing components of the motor-driven assembly requires a much greater application of force by the user when locking and unlocking the locking device. Further, this is desirable in scenarios where the motor-driven assembly is not operational. In these scenarios, the user can use the key-driven actuator without engaging or displacing components of the motor-driven assembly.

Figure 1A:
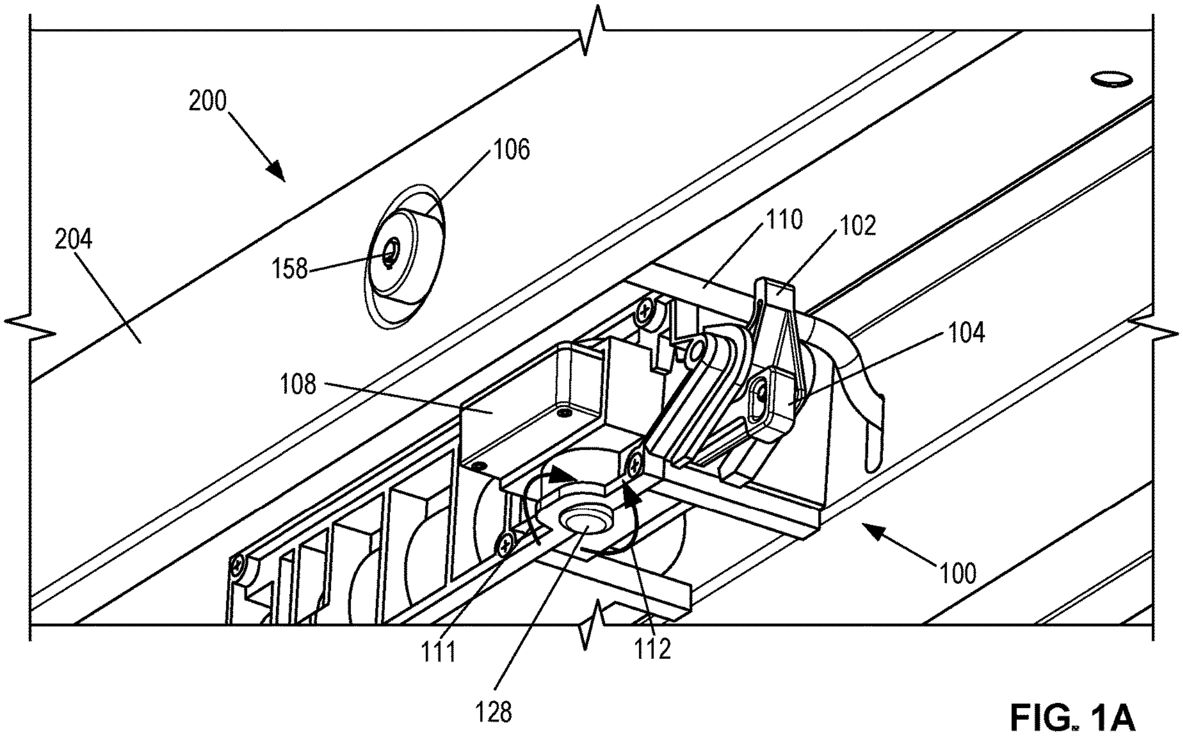
FIG. 1A illustrates a perspective view of a locking device, according to an example embodiment.
Figure 1B:
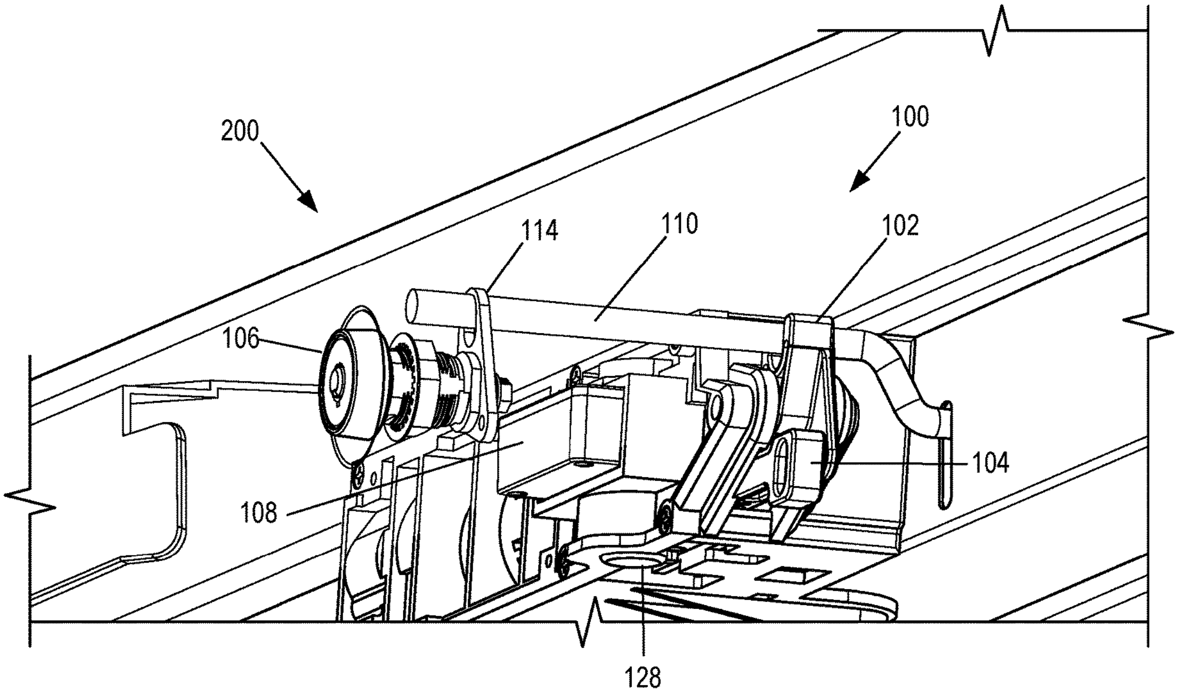
FIG. 1B illustrates another perspective view of a locking device, according to an example embodiment.

Now referring to the Figures, FIGS. 1A and 1B illustrate a locking device 100 according to an example embodiment. In examples, the locking device 100 is coupled to a component 204 of the tool storage unit 200. In example implementations, the tool storage unit 200 may take the form of a cart, chest, or hutch. Additionally or alternatively, the component 204 may one or more parts of the tool storage unit 200 (e.g., drawers, cabinets), various enclosures, among other examples. The tool storage unit 200 may be part of a larger storage device or be a standalone unit. The tool storage unit 200 may be used to store various tools and equipment. The component 204 may take the form of a door or drawer of the tool storage unit 200. As such movement of the locking rod fingers 102, 114 and lock rod 110 between the locked and unlocked positions causes the component 204 to lock and unlock, respectively. For the purposes of illustration, a portion of the component 204 is removed in FIG. 1B.

Figure 2A:
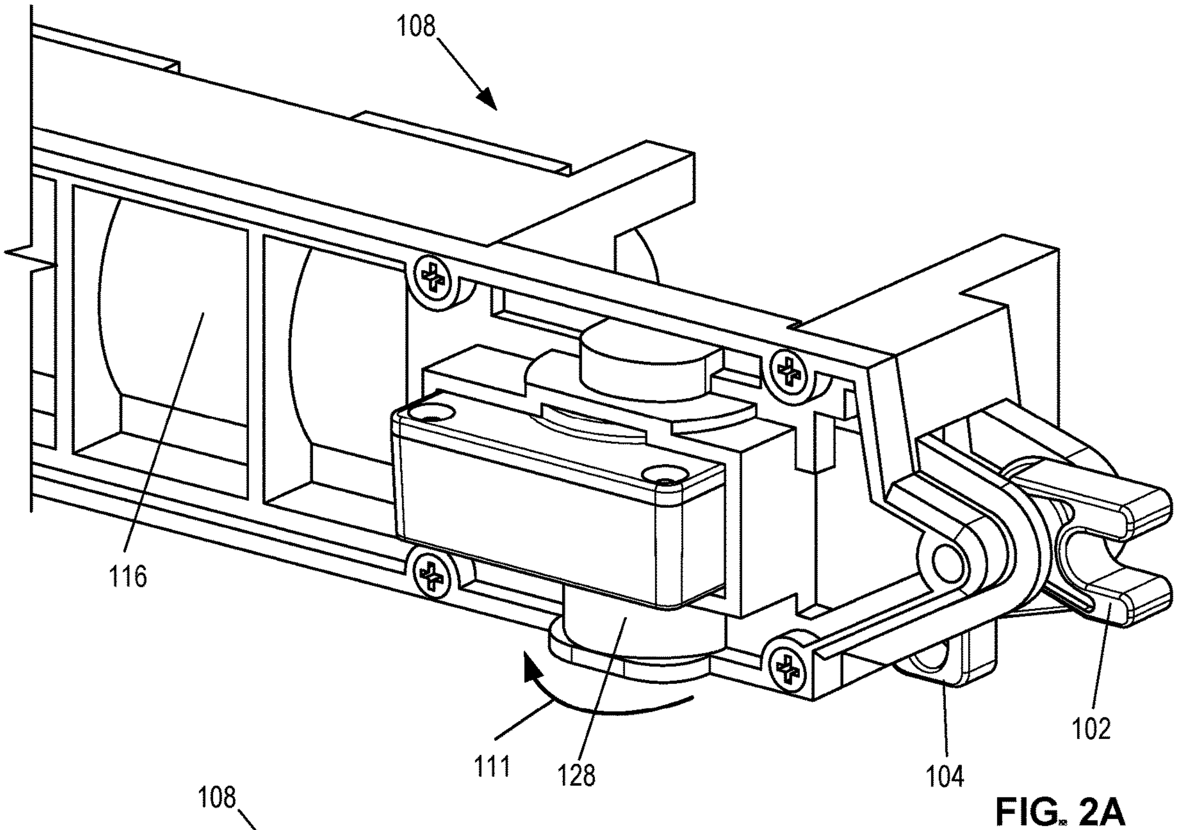
FIG. 2A illustrates a perspective view of a motor-driven assembly, according to an example embodiment.
Figure 2B:
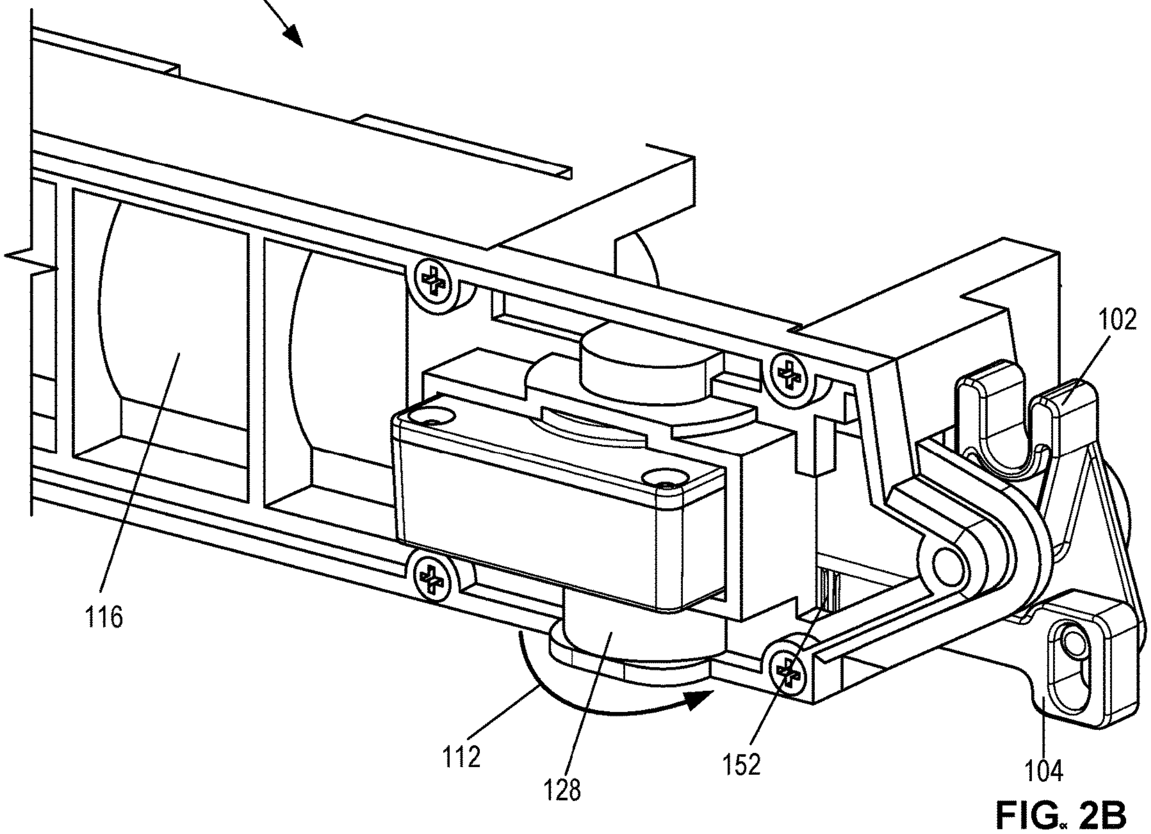
FIG. 2B illustrates another perspective view of a motor-driven assembly, according to an example embodiment.

An example locking device 100 includes a key-driven actuator 106 and a motor-driven assembly 108 both coupled to a lock rod 110 by way of lock rod fingers 102 and 114. The lock rod fingers 102, 114 are each configured to move between a locked position and an unlocked position, which are shown in FIGS. 2A-2B. Moving one or both of the lock rod fingers 102, 114 between the locked and unlocked positions moves the lock rod 110 between an unlocked and locked position.

As shown in FIGS. 1B, the key-driven actuator 106 can include the lock rod finger 114 coupled to the lock rod 110. In examples, the key-driven actuator 106 is an actuator configured to lock and unlock with a physical key. Namely, the key-driven actuator 106 includes a plate with a keyway 158 for receiving a key. The key and keyway 158 are configured to displace the lock rod 110, by way of the lock rod finger 114, from an unlocked position to a locked position in response to a first rotation of the plate from a neutral position in a first locking direction. The key and keyway 158 are further configured to angularly displace the lock rod 110, by way of the lock rod finger 114, from a locked position to an unlocked position in response to a rotation of the plate from a neutral position in a second unlocking direction.

The key-driven actuator 106 can include a center-neutral key position that rotates 90 degrees in either direction from center to lock and unlock the locking device 100, which allows the key to operate the locking device 100.

The motor-driven assembly 108 is coupled to the lock rod 110 by way of a shaft 128 engageable with the locking arm 104. The locking arm 104 is coupled to the lock rod finger 102 which is coupled to the lock rod 110. The motor-driven assembly 108 is configured to rotate the shaft 128 in a first locking direction and a second unlocking direction. Rotating the shaft 128 in a first locking direction 111 retracts the locking arm 104 towards the motor-driven assembly 108, moving the locking arm 104 to a locked position (shown in FIG. 2A). Rotating the shaft 128 in a second unlocking direction 112, opposite the first locking direction 111, extends the locking arm 104 away from the motor-driven assembly 108, moving the locking arm 104 to an unlocked position (shown in FIG. 2B).

FIGS. 2A and 2B illustrate components of the motor-driven assembly 108 according to an example embodiment. In FIG. 2A, the motor-driven assembly 108 is in a locked position. In FIG. 2B, the motor-driven assembly 108 is in an unlocked position. As shown in FIG. 2B, the locking arm 104 includes a rack gear 152. The rack gear 152 is coupled to and engageable with the motor-driven assembly 108, by way of the shaft 128. Namely, as shown in FIG. 2A, the motor-driven assembly 108 is configured to rotate the shaft 128 in a first locking direction 111 to retract the locking arm 104 towards the motor-driven assembly 108, moving the locking arm 104 to the locked position. As shown in FIG. 2B, rotating the shaft 128 in a second unlocking direction 112 extends the locking arm 104 away from the motor-driven assembly 108, moving the locking arm 104 to the unlocked position.

The motor-driven assembly 108 is coupled to a motor 116. The motor 116 can be coupled to a power supply, such as a DC voltage. In examples, the motor 116 is electrically coupled to power supply circuitry. In examples, this power supply circuitry can include polarity reversing circuitry configured to provide a voltage having a first polarity for driving the motor 116 in a first direction and to provide voltage having a second polarity for driving the motor 116 a second direction, opposite the first direction. In an embodiment, the power supply circuitry may be configured for wireless power transmission of power to the motor 116.

Further, the motor-driven assembly 108 and/or the motor 116 can include an electrical component having a transceiver that communicates with a remote control apparatus to remotely operate the motor 116 to lock and unlock the locking device 100 to allow for keyless access to the component 212. Multiple manners of communicating with the motor-driven assembly 108 and/or the motor 116 can be implemented, including infrared, radio frequency identification (RFID), cellular, WIFI, Bluetooth, or any other wireless signal, or a wired connection that communicates the desired information to the motor-driven assembly 108 and/or the motor 116. The motor-driven assembly 108 and/or the motor 116 can rotate the shaft 128, and thereby the locking arm 104, lock rod finger 102, and lock rod 110, to carry out the command from the remote controller. Further, the remote controller need not be remote at all, and instead can be a local controller or interface coupled to the locking device 100, tool storage unit 200, or to any other item, such as, for example, a biometric sensor.

Figure 3A:
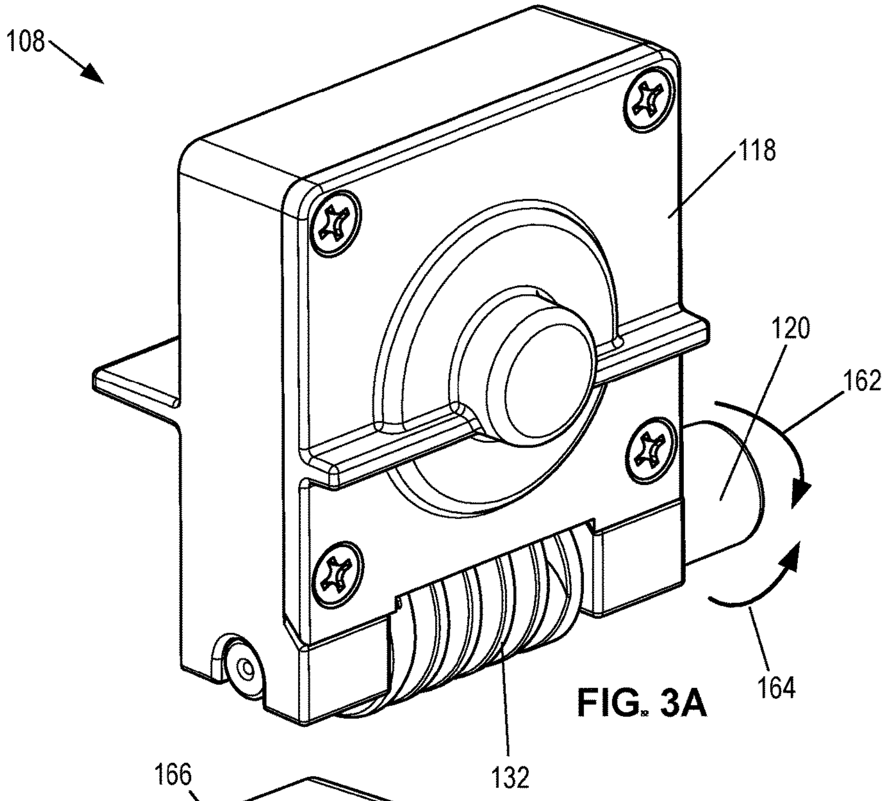
FIG. 3A illustrates a perspective view of components of a motor-driven assembly, according to an example embodiment.
Figure 3B:
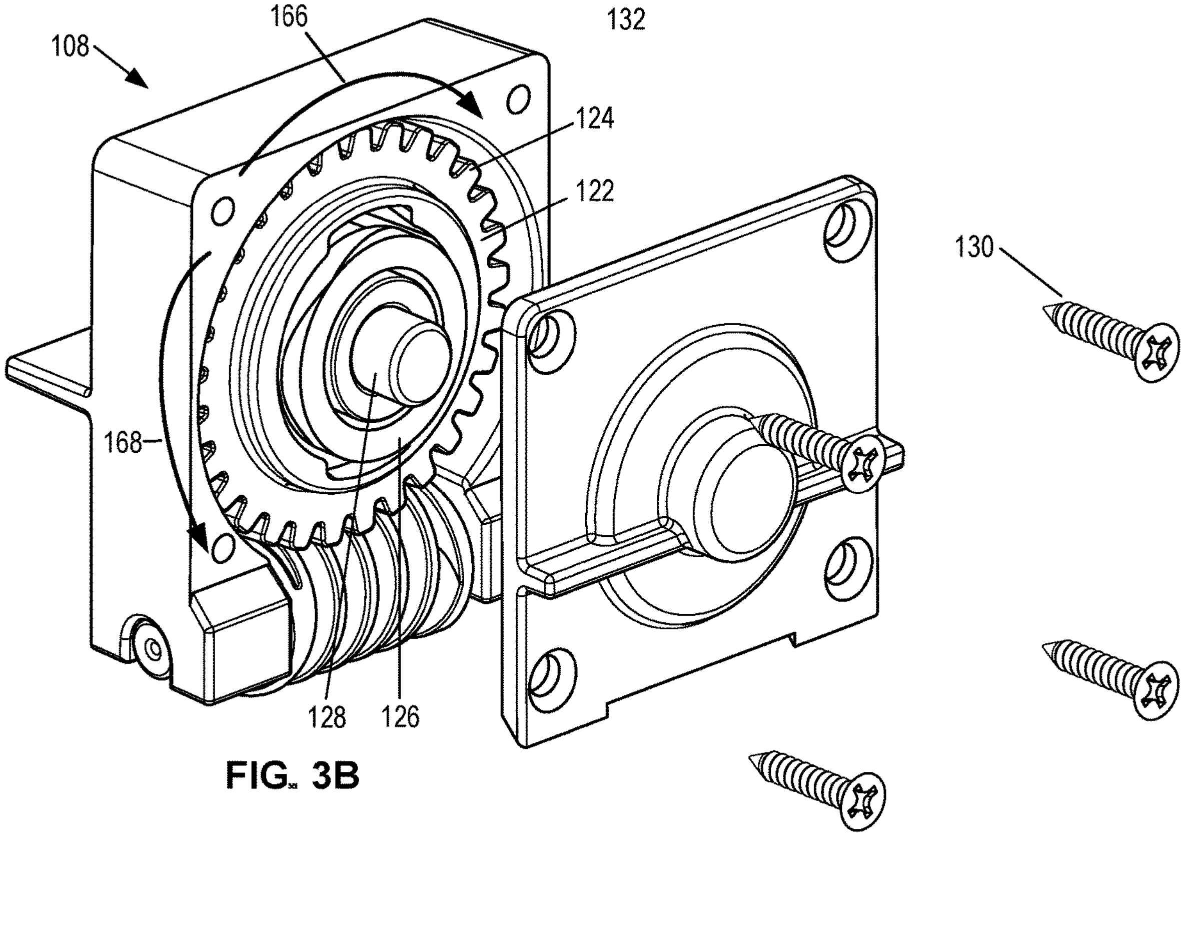
FIG. 3B illustrates an exploded view of components of a motor-driven assembly, according to an example embodiment.

FIGS. 3A-3B show components of the motor-driven assembly 108, according to an example embodiment. Namely, FIG. 3A illustrates a perspective view of the motor-driven assembly 108. The motor-driven assembly 108 includes a cover 118 and a rotatable screw 120. FIG. 3B illustrates the motor-driven assembly 108 with the cover 118 removed. As shown in FIG. 3B, the motor-driven assembly 108 also includes a gear 122, a clutch 126, and the shaft 128.

In examples, the rotatable screw 120 includes threads 132 and is coupled to the motor 116. The rotatable screw 120 is configured to rotate in a first direction 162 and a second direction 164, opposite the first direction 162, by way of the motor 116. In example implementations, the first direction 162 corresponds to locking the locking device 100 and the second direction 164 corresponds to the unlocking the locking device 100.

In examples, the gear 122 includes a set of gear teeth 124 on the outer perimeter of the gear 122. The gear teeth 124 are engageable with the threads of the rotatable screw 120. As such, when the rotatable screw 120 rotates in a first direction 162, the gear 122 also rotates in a first direction. And when the rotatable screw 120 rotates in a second direction, the gear 122 also rotates in a second direction. In example implementations, the first direction corresponds to locking the locking device 100 and the second direction corresponds to the unlocking the locking device 100. Further, in example implementations, the gear 122 is a worm gear and the rotatable screw 120 is a worm gear screw.

In example embodiments, the cover 118 is coupled to the motor-driven assembly 108 by way of fasteners 130. In the examples shown in FIGS. 3A and 3B, the fasteners 130 are threaded screws, however other example fastener types are possible, including, but not limited to, physical connectors, clips, pins, and/or positive and negative latches, or other retention features.

Figure 4A:
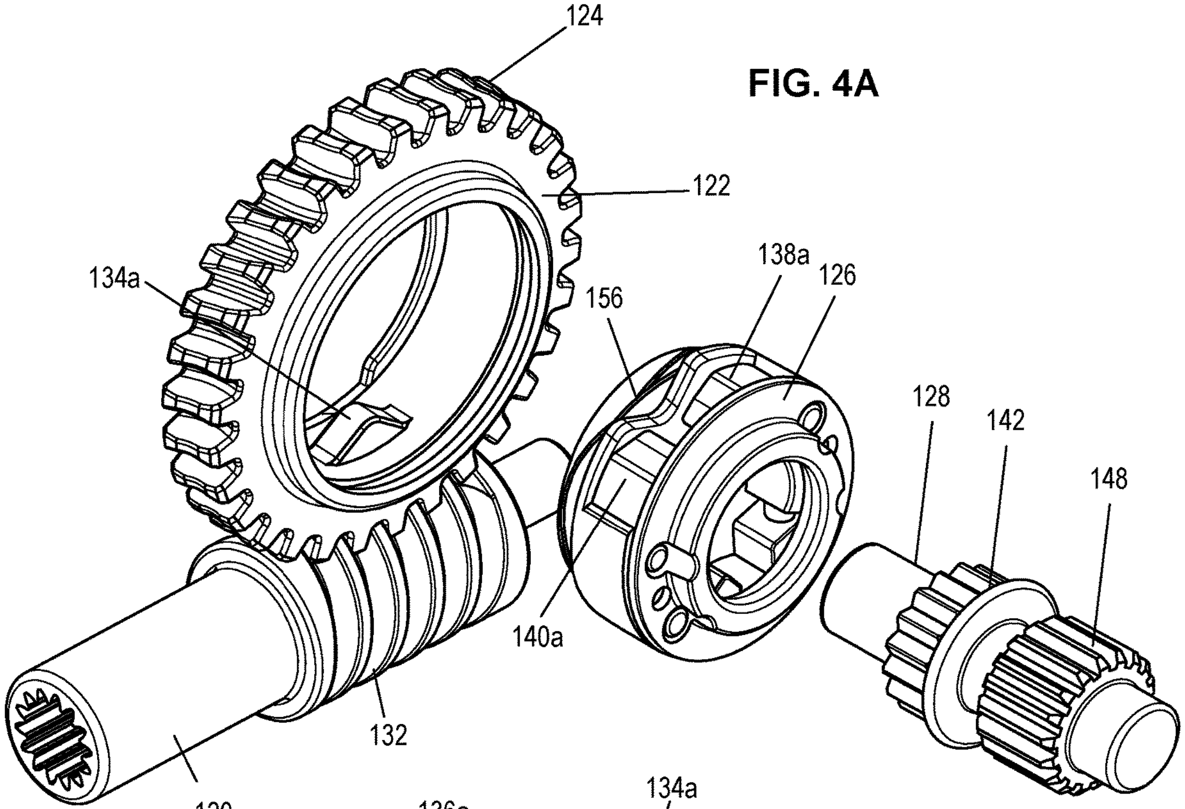
FIG. 4A illustrates an exploded view of components of a motor-driven assembly, according to an example embodiment.
Figure 4B:
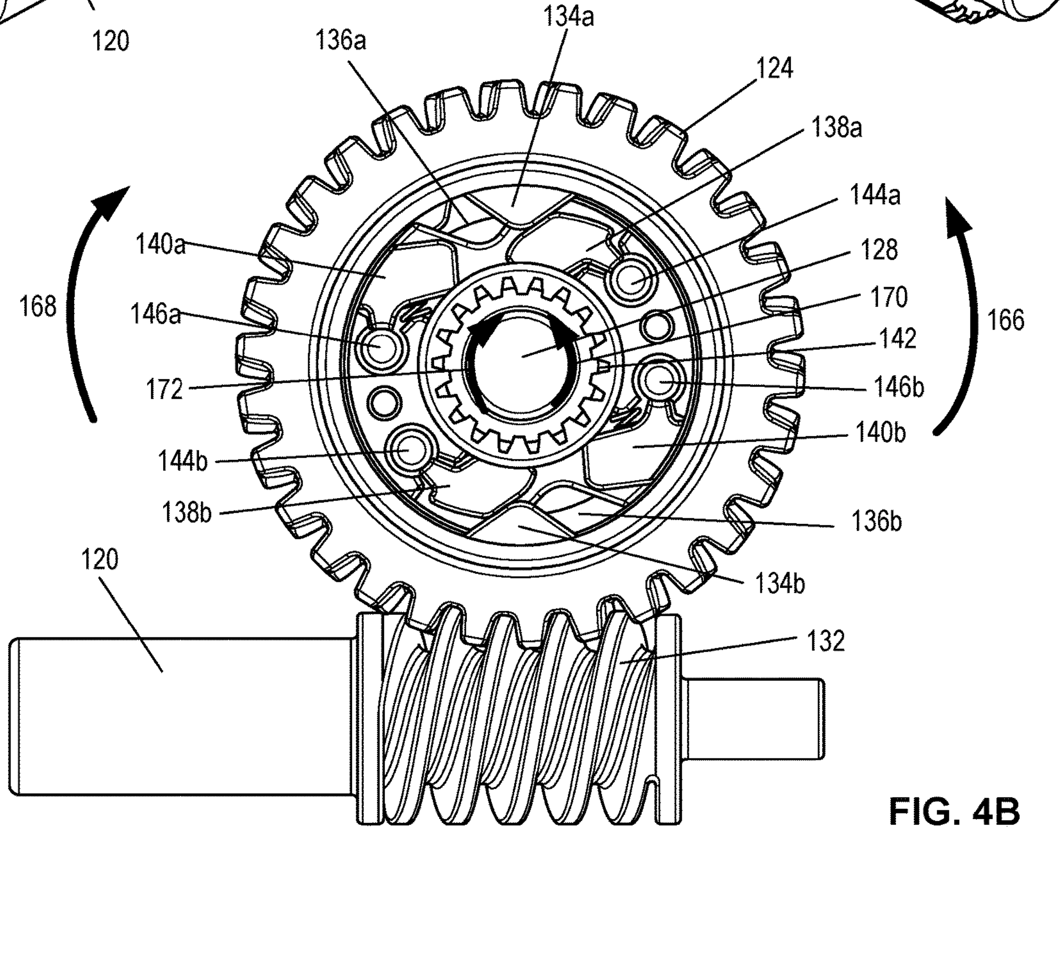
FIG. 4B illustrates a front view of components of a motor-driven assembly, according to an example embodiment.
Figure 4C:
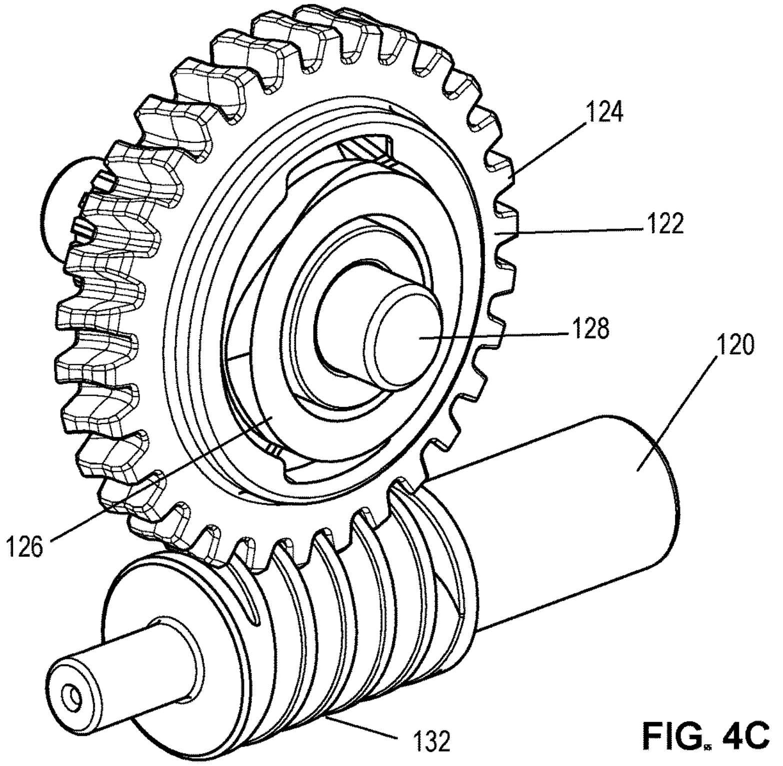
FIG. 4C illustrates a perspective view of components of a motor-driven assembly, according to an example embodiment.

FIGS. 4A-4C illustrate the rotatable screw 120, gear 122, clutch 126, and shaft 128, according to example embodiments. FIG. 4A illustrates an exploded view of the rotatable screw 120, gear 122, clutch 126, and shaft 128, according to an example embodiment.

As shown in FIG. 4A, the shaft 128 includes a set of ratchet teeth 148 and a set of gear teeth 142. When assembled and during operation, the ratchet teeth 148 are positioned outside of the gear 122 and clutch 126 and are engageable with the rack gear 152 on the locking arm 104. Accordingly, rotation of the shaft 128, and thus the ratchet teeth 148, in the first direction 111 retracts the locking arm 104 towards to motor-driven assembly 108, moving the locking arm 104, as well as the lock rod finger 102 and lock rod 110, to a locked position. And rotation of the shaft 128, and thus the ratchet teeth 148,200 in the second direction 112 extends the locking arm 104 away from the motor-driven assembly 108, moving the locking arm 104, as well as the lock rod finger 102 and lock rod 110, to an unlocked position.

Similarly, movement of the lock rod 110 and lock rod finger 102 to the locked position, for example, by way of the key-driven actuator 106, retracts the locking arm 104 towards the motor-driven assembly 108 to the locked position which rotates the ratchet teeth 148, as well as the shaft 128, in a first direction. And movement of the lock rod 110 and lock rod finger 102 to the unlocked position, for example, by way of the key-driven actuator 106, extends the locking arm 104 away from the motor-driven assembly 108 to the unlocked position which rotates the ratchet teeth 148, as well as the shaft 128 in second direction.

When assembled and during operation, the set of gear teeth 124 on the shaft 128 are positioned inside the clutch 126 and are engageable with the clutch 126 and gear 122. Namely, as shown in FIGS. 4A and 4B, the gear 122 includes a first cam surface 134*a* and a second cam surface 136*a* on the inner perimeter of the gear 122. In examples, the gear 122 includes a first set of cam surfaces 134*a* and 134*b* and a second set of cam surfaces 136*a* and 136*b* on the inner perimeter of the gear 122. The cam surfaces 134*a*, 134*b*, 136*a*, and 136*b* extend from the inner perimeter of the gear towards the center of the gear 122. While the example gear 122 shown in FIGS. 4A and 4B includes two sets of cam surfaces with two cam surfaces in each set, many example configurations are possible.

As shown in FIGS. 4A and 4B, the clutch 126 includes a first pawl 138*a* and a second pawl 140*a*. In some examples, the clutch 126 includes a first set of pawls 138*a* and 138*b* and a second set of pawls 140*a* and 140*b*. Each of the pawls 138*a*, 138*b*, 140*a*, and 140*b* include a corresponding pawl spring 144*a*, 144*b*, 146*a*, and 146*b*. The pawl springs 144*a*, 144*b*, 146*a*, and 146*b* allow the pawls 138*a*, 138*b*, 140*a*, and 140*b* to engage with the cam surfaces 134*a*, 134*b*, 136*a*, and 136*b*, and thus the gear teeth 142 of the shaft 128, when the gear 122 is rotating and to disengage from the cam surfaces 134*a*, 134*b*, 136*a*, and 136*b*, and thus the gear teeth 142 of the shaft 128, when the gear 122 is stationary. While the example gear 122 shown in FIGS. 4A and 4B includes two sets of pawls with two pawls in each set, other example configurations are possible.

In some examples, the clutch 126 further includes a wave spring set 156. The wave spring set 156 applies friction to the components of the clutch 126 (e.g., pawls 138*a*, 138*b*, 140*a*, and 140*b* and pawl springs 144*a*, 144*b*, 146*a*, and 146*b*) to hold the components in place during operation.

The first pawl 138*a* is engaged or actuated by the first cam surface 134*a* when the gear 122 rotates in the first direction 166. And the second pawl 140*a* is actuated by the second cam surface 136*a* when the gear 122 is rotated in the second direction 168. Similarly, the first set of pawls 138*a* and 138*b* are actuated by the first cam surfaces 134*a* and 134*b* when the gear 122 rotates in the first direction 166. And the second set of pawls 140*a* and 140*b* is actuated by the second set of cam surfaces 136*a* and 136*b* when the gear 122 is rotated in a second direction 168. The first direction corresponds to locking the locking device 100 and the second direction corresponds to unlocking the locking device 100.

When the first set of pawls 138*a*, 138*b* are engaged by the first set of cam surfaces 134*a*, 134*b*, the first set of pawls 138*a*, 138*b* are pressed towards the center of the clutch 126 to engage the gear teeth 142 of the shaft 128. Namely, the corresponding pawl springs 144*a*, 144*b* are compressed to move the first set of pawls 138*a*, 138*b* from a disengaged position to an engaged position. Accordingly, when the gear 122 rotates in the first direction 166, the clutch 126 will also rotate in a first direction 170. As described above, rotation of the clutch 126 in the first direction 170 retracts the locking arm 104 towards the motor-driven assembly 108 into the locked position by way of the ratchet teeth 148 and rack gear 152.

Similarly, when the second set of pawls 140*a*, 140*b* are engaged by the second set of cam surfaces 136*a*, 136*b*, the second set of pawls 140*a*, 140*b* are pressed towards the center of the clutch 126 to engage the gear teeth 142 of the of the shaft 128. Namely, the corresponding pawl springs 146*a*, 146*b* are compressed to move the second set of pawls 138*a*, 138*b* from a disengaged position to an engaged position. Accordingly, when the gear 122 rotates in the second direction 168, the clutch 126 will also rotate in a second direction 172. As described above, rotation of the clutch 126 in the second direction 172 extends the locking arm 104 away from the motor-driven assembly 108 into the unlocked position by way of the ratchet teeth 148 and rack gear 146.

As described above, rotation of the rotatable screw 120, by way of the motor 116 causes the gear 122 to rotate by way of the rotatable screw threads 132 and gear teeth 124. Accordingly, in the manners described above, rotation of the rotatable screw 120 in a first direction 162, by way of the motor 116, causes the gear 122 to rotate in the first direction 166 and shaft 128 to rotate in the first direction 111, moving the locking arm 104, lock rod finger 102, and lock rod 110 to the locked position. And rotation of the rotatable screw 120 in a second direction 164, by way of the motor 116, causes the gear 122 to rotate in the second direction 168 and the shaft 128 to rotate in the second direction 112, moving the locking arm 104, lock rod finger 102, and lock rod 110 to the unlocked position.

In example embodiments, the pawls 138*a*, 138*b*, 140*a*, and 140*b* are biased in a disengaged positioned by way of the corresponding pawl springs 144*a*, 144*b*, 146*a*, and 146*b*. As such, when the rotatable screw 120 and gear 122 are stationary, the shaft 128 can rotate freely, without engaging the pawls 138*a*, 138*b*, 140*a*, and 140*b*, clutch 126, gear 122, or rotatable screw 120.

As described above, movement of the locking arm 104 between the locked and unlocked positions by way of the key-driven actuator 106 rotates the shaft 128 in the first direction 111 and second direction 112, respectively. Because the pawls 138*a*, 138*b*, 140*a*, and 140*b* are biased in the disengaged position, movement of the locking arm 104 between the locked and unlocked position, by way of the key-driven actuator 106, allows rotation of the shaft 128 without displacing and/or rotation of the clutch 126, gear 122, or rotatable screw 120. Accordingly, when a user locks or unlocks the locking device 100 using a standard key in the key-driven actuator 106, the user will not be actuating and displacing the components of the motor-driven assembly 108 (e.g., the clutch 126, the gear 122, and the rotatable screw 120). Further, when the motor-driven assembly 108 is not operational the user will not be actuating and displacing the components of the motor-driven assembly 108 (e.g., the clutch 126, the gear 122, and the rotatable screw 120). This is desirable, as actuating and displacing the components of the motor-driven assembly 108 requires a greater application of force by the user when locking and unlocking the locking device 100, than just displacing components of the key-driven actuator 106.

Figure 5:
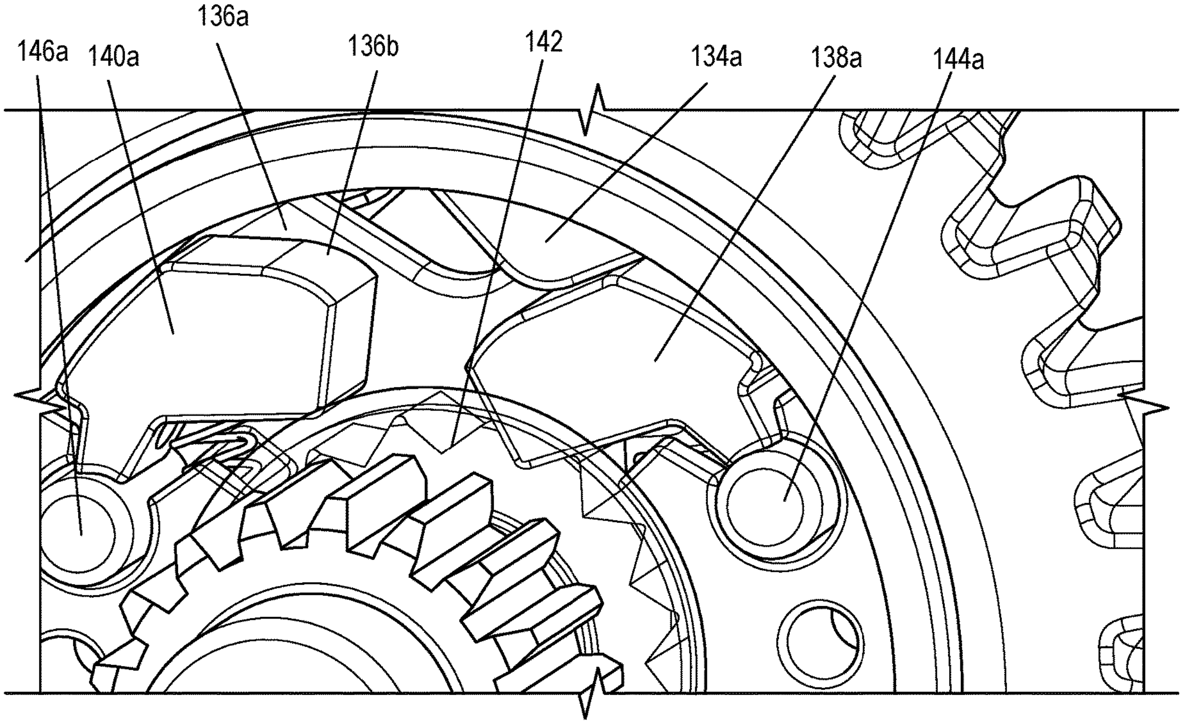
FIG. 5 illustrates components of a gear, clutch, and shaft, according to an example embodiment.

FIG. 5 illustrates pawls in engaged and disengaged positions, according to an example embodiment. For purposes of illustration, components of the clutch 126 have been removed in FIG. 5. In the example embodiment shown in FIG. 5, the gear 122 is rotating in the first direction. In this example embodiment, the first pawl 138*a* is in the engaged position. Namely, while the gear 122 rotates in first direction, the first cam surface 134*a* engages the first pawl 138*a*, compressing the first pawl spring 144*a* and moving the first pawl 138*a* to engage the gear teeth 144 of the shaft 128.

Thus, rotation of the gear 122 in the first direction rotates the shaft 128 in the first direction.

Further, in this example embodiment, the second pawl 140*a* is in the disengaged position. Namely, the corresponding second pawl spring 146*a* holds the second pawl 140*a* away from the gear teeth 142 of the shaft 128, as rotation of the gear 122 in the first direction does not cause the second cam surface 136*a* to engage the second pawl 140*a*. Accordingly, while the gear 122 rotates in the first direction, the second pawl 140*a* remains disengaged from the gear teeth 144 of the shaft 128.

While the gear 122 rotates in the second direction, the second cam surface 136*a* engages the second pawl 140*a* compressing the second pawl spring 146*a* and moving the second pawl 140*a* to engage the gear teeth 142 of the shaft 128. Thus, rotation of the gear 122 in the second direction rotates the shaft 128 in the second direction. And, while the gear rotates in the second direction, the first pawl 138*a* is in the disengaged position by way of the first pawl spring 144*a*. Accordingly, while the gear 122 rotates in the second direction, the first pawl 138*a* remains disengaged from the gear teeth 142 of the shaft 128.

As described above, the pawls 138*a*, 138*b*, 140*a*, and 140*b* are biased in a disengaged positioned by way of the corresponding pawl springs 144*a*, 144*b*, 146*a*, and 146*b*. Thus, when the gear 122 is not rotating, the pawls 138*a*, 138*b*, 140*a*, and 140*b* remain disengaged from the gear teeth 144 of the shaft 128. Accordingly, when the shaft 128 rotates either direction by operation of the key-driven actuator 106, the shaft 128 is free to rotate without engaging components of the motor-driven assembly (e.g., the clutch 126, gear 122, and rotatable screw 120).

Figure 6:
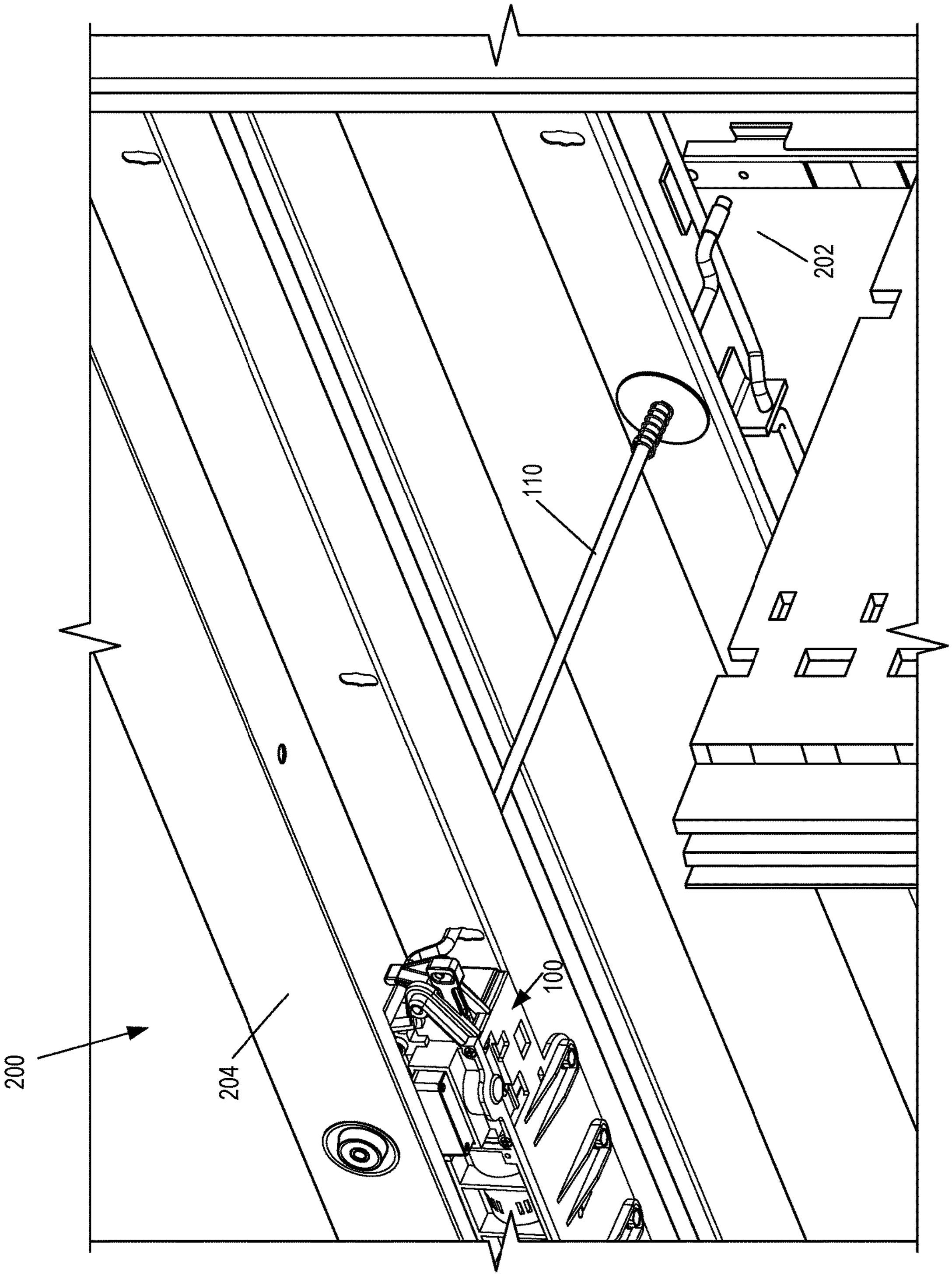
FIG. 6 illustrates a perspective view of a portion of a tool storage unit having a locking device, according to an example embodiment.

FIG. 6 illustrates a tool storage unit 200 including the locking device 100 coupled to a tool storage unit 200. The locking device 100 can include any of the components as described herein. In some example embodiments the lock rod 110 extends from the locking device 100 to a housing 202 of the tool storage unit 200 coupling the locking device 100 to the tool storage unit 200.

Accordingly, moving the locking arm between the locked position and the unlocked position, as described in any manner herein, unlocks the tool storage unit 200 and/or the housing 202 of the tool storage unit 200. And moving the locking arm between the unlocked position and the locked position, as described in any manner herein, locks the tool storage unit 200 and/or the housing 202 of the tool storage unit 200.

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a device.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A locking device comprising:

a locking arm movable between a locked position and an unlocked position;

a shaft including a first set of gear teeth and a set of ratchet teeth that engage the locking arm so as to move the locking arm between the locked position and the unlocked position;

a key-driven actuator configured to rotate the shaft with movement of a key;

a motor-driven assembly configured to selectively engage the shaft and rotate the shaft, the motor-driven assembly comprising:

a motor;

a rotatable screw coupled to the motor;

a gear comprising a second set of gear teeth on an outer perimeter of the gear, a first cam surface on an inner perimeter of the gear and a second cam surface on the inner perimeter of the gear, wherein the first cam surface and the second cam surface extend from the inner perimeter of the gear towards a center of the gear, and wherein the second set of gear teeth engage the rotatable screw; and a clutch configured to selectively engage the shaft upon rotation of the gear, the clutch including a first pawl configured to be actuated by the first cam surface, when the gear rotates in a first direction, so as to engage the first set of gear teeth of the shaft and a second pawl configured to be actuated by the second cam surface, when the gear rotates in a second direction, so as to engage the first set of gear teeth of the shaft, wherein the first and second pawls are configured to disengage with the shaft when the rotatable screw is stationary.

2. The locking device of claim 1, wherein the first pawl is coupled to a first pawl spring and the second pawl is coupled to a second pawl spring, and wherein the first and second pawls are configured to disengage with the shaft when the rotatable screw is stationary by way of the first and second pawl springs.

3. The locking device of claim 2, wherein when the first pawl is actuated by the first cam surface, the first pawl spring is compressed.

4. The locking device of claim 2, wherein when the second pawl is actuated by the second cam surface, the second pawl spring is compressed.

5. The locking device of claim 2, wherein the first pawl and the second pawl are bias in a disengaged position.

6. The locking device of claim 1, wherein the locking arm comprises rack gear engageable with the set of ratchet teeth.

7. The locking device of claim 1, further comprising a lock rod coupled to the locking arm by way of a lock rod finger, wherein the lock rod is movable between a locked position and an unlocked position.

8. The locking device of claim 7, wherein the lock rod finger is a first lock rod finger, and wherein the key-driven actuator comprises a second lock rod finger coupled to the lock rod.

9. The locking device of claim 1, wherein the motor comprises a transceiver that is configured to communicate with a remote control apparatus to remotely operate the motor.

10. The locking device of claim 9, wherein the transceiver is configured to communicate with the remote control apparatus by way of at least one of infrared, radio frequency identification (RFID), cellular, WIFI, Bluetooth, wireless signal, or a wired connection.

11. The locking device of claim 1, wherein the clutch comprises a wave spring set.

12. The locking device of claim 1, wherein the gear is a worm gear and wherein the rotatable screw is a worm gear screw.

13. The locking device of claim 1, wherein the locking device is coupled to a tool box, wherein moving the locking arm to the locked position locks the tool box, and wherein moving the locking arm to the unlocked position unlocks the tool box.

14. The locking device of claim 1, wherein the first cam surface is a first set of cam surfaces, and wherein the second cam surface is a second set of cam surfaces.

15. The locking device of claim 1, wherein the first pawl is a first set of pawls, and wherein the second pawl is a second set of pawls.

16. The locking device of claim 1, wherein the key-driven actuator is configured to move the locking arm between the locked position and the unlocked position with movement of a key.

17. A tool storage unit comprising:
- a housing configured to store a tool; and
- a locking device coupled to the housing, the locking device comprising:
  - a locking arm movable between a locked position and an unlocked position;
  - a shaft including a first set of gear teeth and a set of ratchet teeth that engage the locking arm so as to move the locking arm between the locked position and the unlocked position;
  - a key-driven actuator configured to rotate the shaft with movement of a key;
  - a motor-driven assembly configured to selectively engage the shaft and rotate the shaft, the motor-driven assembly comprising:
    - a motor;
    - a rotatable screw coupled to the motor,
    - a gear comprising a second set of gear teeth on an outer perimeter of the gear, a first cam surface on an inner perimeter of the gear and a second cam surface on the inner perimeter of the gear, wherein the first cam surface and the second cam surface extend from the inner perimeter of the gear towards a center of the gear, and wherein the second set of gear teeth engage the rotatable screw; and
  - a clutch configured to selectively engage the shaft upon rotation of the gear, the clutch including a first pawl configured to be actuated by the first cam surface, when the gear rotates in a first direction, so as to engage the first set of gear teeth of the shaft and a second pawl configured to be actuated by the second cam surface, when the gear rotates in a second direction, so as to engage the first set of gear teeth of the shaft, wherein the first and second pawls are configured to disengage with the shaft when the rotatable screw is stationary, wherein moving the locking arm between the locked position and the unlocked position unlocks the housing.

18. The tool storage unit of claim 17, wherein the first pawl is coupled to a first pawl spring and the second pawl is coupled to a second pawl spring, and wherein the first and second pawls are configured to disengage with the shaft when the rotatable screw is stationary by way of the first and second pawl springs.

19. The tool storage unit of claim 18, wherein when the first pawl is actuated by the first cam surface, the first pawl spring is compressed.

20. The tool storage unit of claim 18, wherein when the second pawl is actuated by the second cam surface, the second pawl spring is compressed.

* * * * *